(12) United States Patent
Reaves

(10) Patent No.: US 7,182,805 B2
(45) Date of Patent: Feb. 27, 2007

(54) CORONA-DISCHARGE AIR MOVER AND PURIFIER FOR PACKAGED TERMINAL AND ROOM AIR CONDITIONERS

(75) Inventor: Debra Jean Reaves, Aurora, IL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 11/288,915

(22) Filed: Nov. 29, 2005

(65) Prior Publication Data

US 2006/0112708 A1    Jun. 1, 2006

Related U.S. Application Data

(60) Provisional application No. 60/632,324, filed on Nov. 30, 2004.

(51) Int. Cl.
*B03C 3/014*    (2006.01)
*B03C 3/68*    (2006.01)

(52) U.S. Cl. .................. 96/24; 95/7; 95/73; 95/74; 96/30; 96/74

(58) Field of Classification Search .............. 96/18, 96/19, 24, 25, 30, 31, 55, 74, 96, 97; 95/2–4, 95/7, 70, 73, 74; 361/230–235; 454/237
See application file for complete search history.

(56) References Cited

U.S. PATENT DOCUMENTS

| | | |
|---|---|---|
| 2,765,975 A | 10/1956 | Lindenblad et al. |
| 2,795,401 A * | 6/1957 | Cooper et al. ............... 165/5 |
| 3,503,348 A | 3/1970 | Dvirka |
| 3,504,482 A * | 4/1970 | Goettl ........................... 96/18 |

(Continued)

FOREIGN PATENT DOCUMENTS

CA    2117222    9/1995

(Continued)

OTHER PUBLICATIONS

The Sharper Image, SI857 OzoneGuard Professional Series Ionic Breeze Quadra Silent Air Purifier, pages printed from website, date last visited Nov. 14, 2005, 5 pages, http://www.sharperimagebest,com/si857.html.

(Continued)

*Primary Examiner*—Richard L. Chiesa
(74) *Attorney, Agent, or Firm*—Reinhart Boerner Van Deuren P.C.

(57) ABSTRACT

An air conditioning device for heating and/or an environment is provided. The air conditioning device includes a heat exchanging apparatus, a passage, and a corona discharge apparatus. The passage is in thermal communication with the heat exchanging apparatus and extends between an inlet and an outlet. The corona discharge apparatus is disposed within the passage to draw a fluid from the environment into the passage through the inlet, move the fluid through the passage to permit the heat exchanger to remove or heat the fluid, and expel the fluid through the outlet into the environment. As such, the environment is cooled or heated. Embodiments of the present invention include package terminal air conditioners (PTACs), room air conditioners (RACs), and mini-split heating and cooling systems.

20 Claims, 3 Drawing Sheets

U.S. PATENT DOCUMENTS

| | | | |
|---|---|---|---|
| 3,638,058 A | | 1/1972 | Fritzius |
| 3,699,387 A | | 10/1972 | Edwards |
| 3,751,715 A | | 8/1973 | Edwards |
| 3,930,611 A | | 1/1976 | Demaray |
| 3,973,927 A | * | 8/1976 | Furchner et al. ............ 95/3 |
| 4,076,011 A | | 2/1978 | Proulx |
| 4,210,847 A | | 7/1980 | Shannon et al. |
| 4,231,766 A | | 11/1980 | Spurgin et al. |
| 4,282,591 A | | 8/1981 | Andreuccetti |
| 4,288,990 A | | 9/1981 | Schulz |
| 4,343,776 A | | 8/1982 | Carr et al. |
| 4,380,720 A | | 4/1983 | Fleck |
| 4,405,507 A | | 9/1983 | Carr et al. |
| 4,462,540 A | | 7/1984 | Dytch |
| 4,643,745 A | | 2/1987 | Sakakibara et al. |
| 4,675,029 A | | 6/1987 | Norman et al. |
| 4,789,801 A | | 12/1988 | Lee |
| 4,812,711 A | * | 3/1989 | Torok et al. ............ 315/111.91 |
| 4,955,991 A | * | 9/1990 | Torok et al. ............ 96/50 |
| 4,969,508 A | | 11/1990 | Tate et al. |
| 5,042,997 A | * | 8/1991 | Rhodes ............ 96/18 |
| 5,055,115 A | * | 10/1991 | Yikai et al. ............ 96/59 |
| 5,071,455 A | | 12/1991 | Abedi-Asl |
| 5,077,500 A | | 12/1991 | Török et al. |
| 5,082,173 A | | 1/1992 | Poehlman et al. |
| 5,144,941 A | | 9/1992 | Saito et al. |
| 5,271,558 A | | 12/1993 | Hampton |
| 5,272,477 A | | 12/1993 | Tashima et al. |
| 5,422,331 A | | 6/1995 | Galligan et al. |
| 5,595,342 A | | 1/1997 | McNair et al. |
| 5,667,564 A | | 9/1997 | Weinberg |
| 5,702,244 A | | 12/1997 | Goodson et al. |
| 5,803,357 A | | 9/1998 | Lakin |
| 5,833,134 A | | 11/1998 | Ho et al. |
| 5,924,486 A | | 7/1999 | Ehlers et al. |
| 5,958,112 A | | 9/1999 | Nojima |
| 6,116,512 A | | 9/2000 | Dushane et al. |
| 6,129,781 A | * | 10/2000 | Okamoto et al. ............ 96/25 |
| 6,176,977 B1 | | 1/2001 | Taylor et al. |
| 6,213,404 B1 | | 4/2001 | Dushane et al. |
| 6,287,368 B1 | | 9/2001 | Ilmasti |
| 6,375,902 B1 | | 4/2002 | Moini et al. |
| 6,375,905 B1 | | 4/2002 | Moini et al. |
| 6,449,533 B1 | | 9/2002 | Mueller et al. |
| 6,464,754 B1 | * | 10/2002 | Ford ............ 95/26 |
| 6,504,308 B1 | | 1/2003 | Krichtafovitch et al. |
| 6,508,982 B1 | * | 1/2003 | Shoji ............ 422/22 |
| 6,513,723 B1 | | 2/2003 | Mueller et al. |
| 6,635,106 B2 | * | 10/2003 | Katou et al. ............ 96/67 |
| 6,664,741 B1 | | 12/2003 | Krichtafovitch |
| 6,699,529 B2 | | 3/2004 | Garner et al. |
| 6,727,657 B2 | | 4/2004 | Krichtafovitch et al. |
| D499,476 S | | 12/2004 | Holderfield et al. |
| D500,848 S | | 1/2005 | Holderfield et al. |
| D501,042 S | | 1/2005 | Holderfield et al. |
| 2001/0032544 A1 | * | 10/2001 | Taylor et al. ............ 96/19 |
| 2001/0048030 A1 | | 12/2001 | Sharood et al. |
| 2003/0024487 A1 | | 2/2003 | Hughes |
| 2003/0090209 A1 | | 5/2003 | Krichtafovitch et al. |
| 2003/0234618 A1 | | 12/2003 | Krichtafovitch |
| 2004/0004440 A1 | | 1/2004 | Krichtafovitch et al. |
| 2004/0004797 A1 | | 1/2004 | Krichtafovitch et al. |
| 2004/0133314 A1 | | 7/2004 | Ehlers et al. |
| 2004/0155612 A1 | | 8/2004 | Krichtafovitch |
| 2004/0183454 A1 | | 9/2004 | Krichtafovitch |
| 2004/0212329 A1 | | 10/2004 | Krichtafovitch et al. |
| 2004/0217720 A1 | | 11/2004 | Krichtafovitch et al. |
| 2005/0011512 A1 | | 1/2005 | Bachinski et al. |
| 2005/0043907 A1 | | 2/2005 | Eckel et al. |
| 2005/0194457 A1 | | 9/2005 | Dolan |
| 2005/0214186 A1 | | 9/2005 | Michalakos et al. |
| 2006/0112828 A1 | | 6/2006 | Ehlers |
| 2006/0112829 A1 | | 6/2006 | Ashworth |
| 2006/0112955 A1 | | 6/2006 | Reaves |
| 2006/0113398 A1 | | 6/2006 | Ashworth |
| 2006/0114637 A1 | | 6/2006 | Ashworth |
| 2006/0125648 A1 | | 6/2006 | Young |

FOREIGN PATENT DOCUMENTS

| | | | |
|---|---|---|---|
| CA | 2370966AA | 12/2000 | |
| JP | 61134524 A | 6/1986 | |
| JP | 362057662 A | 3/1987 | |
| JP | 63201437 A | 8/1988 | |
| JP | 01312340 A | 12/1989 | |
| JP | 02215037 A | 8/1990 | |
| JP | 4-55121 * | 2/1992 | ............ 95/73 |
| JP | 410043628 A | 2/1998 | |

OTHER PUBLICATIONS

YET2.COM, NoZone The Intelligent Air Freshener, pages printed from website, date last visited Nov. 14, 2005, 2 pages, http://www.yet2.com/app/list/techpak?id =36127&sid=360&abc-0.

Engelhard, PremAir catalyst now part of The Sharper Image's Ionic Breeze Air Purifiers, page printed from website, date last visited Nov. 14, 2005, http://www.engelhard.com/Lang1/xDocID1EF8CDE1FB754A8788E84A989F41EA6C/xDocTable_Cas.

Lara A. Gundel, Douglas P. Sullivan, Gregory Y. Katsapov, William J. Fisk, A pilot study of energy efficient air cleaning for ozone, report, Indoor Environment Department Environmental Energy Technologies Division Lawrence Berkeley National Laboratory, University of California, Nov. 28, 2002, 15 pages, posted at the eScholarship Repository, University of California, http://repositories.cdlib.org/lbnl/LBNL-51836.

Theta Engineering, "Smart" Thermostat, website, date last visited Oct. 26, 2006, previously visited Oct. 27, 2005, 3 pages, http://www.thetaeng.com/SmartThermostat.htm.

* cited by examiner

CORONA-DISCHARGE AIR MOVER AND PURIFIER FOR PACKAGED TERMINAL AND ROOM AIR CONDITIONERS

CROSS-REFERENCE TO RELATED PATENT APPLICATIONS

This patent application claims the benefit of U.S. Provisional Patent Application No. 60/632,324, filed Nov. 30, 2004, the teachings and disclosure of which are hereby incorporated in their entireties by reference thereto.

FIELD OF THE INVENTION

This invention generally relates to air conditioners and, more particularly, to air movement and filtering components of air conditioners.

BACKGROUND OF THE INVENTION

Air conditioners typically employ conventional rotating air movers such as fans and blowers to draw air into the air conditioner, force it through a heat exchanger, and then expel cooled or heated air back out into the room. An air filter may be added to further condition the air.

Unfortunately, fans and blowers tend to be noisy, especially in the relative quiet of a living room, bedroom, or hotel room. Furthermore, fans and blowers contain rotating and moving parts that usually wear out over time.

Therefore, an apparatus that can quietly move, and perhaps even filter, the air passing through an air conditioner without relying upon rotating parts would be desirable. The invention provides such an apparatus. These and other advantages of the invention, as will as additional inventive features, will be apparent from the description of the invention provided herein.

BRIEF SUMMARY OF THE INVENTION

The application for this invention is a residential and a light commercial package terminal air conditioner (PTAC), a room air conditioner (RAC), and a mini-split heating and cooling system. The invention replaces fans and blowers with a corona-discharge air-moving apparatus that contains no moving parts. The invention is quieter, more efficient and more reliable than fans or blowers and can provide air purification without the use of external filters or devices. The invention will be valuable in applications where these advantages are important to the end user, such as in hotel rooms, and for heating, ventilation, and air conditioning (HVAC) original equipment manufacturers (OEM's) that supply the PTAC, the RAC, and the mini-split products to the residential and light commercial industries.

In one aspect, the invention provides an air conditioning device for heating and/or cooling an environment. The air conditioning device comprises a housing, a heat exchanging apparatus, and a corona discharge apparatus. The housing has a passage extending therethrough between an inlet and an outlet. The heat exchanging apparatus is in thermal communication with the passage. The corona discharge apparatus is positioned in relation to the passage. As such, when the corona discharge apparatus is operated, air from the environment is drawn into the passage through the inlet, moved through the passage, wherein a heat exchange with the heat exchanging apparatus takes place, and expelled through the outlet into the environment.

In another aspect, the invention provides an air conditioner for cooling an environment. The air conditioner comprises a heat exchanging apparatus, a passage, a positively charged emitter array, and a negatively charged collector array. The heat exchanging apparatus is configured to absorb heat. The passage is operably coupled to the heat exchanging apparatus and extends between an inlet and an outlet. The positively charged emitter array and a negatively charged collector array are in the passage. The negatively charged emitter array is in spaced relation to the positively charged emitter array. The positively charged emitter array and the negatively charged collector array cooperatively produces an electric wind in the passageway. As such, a fluid is drawn from the environment into the passage through the inlet, the fluid is moved through the passage where the heat from the fluid is absorbed by the heat exchanging apparatus to cool the fluid, and the cooled fluid is expelled through the outlet into the environment to cool the environment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
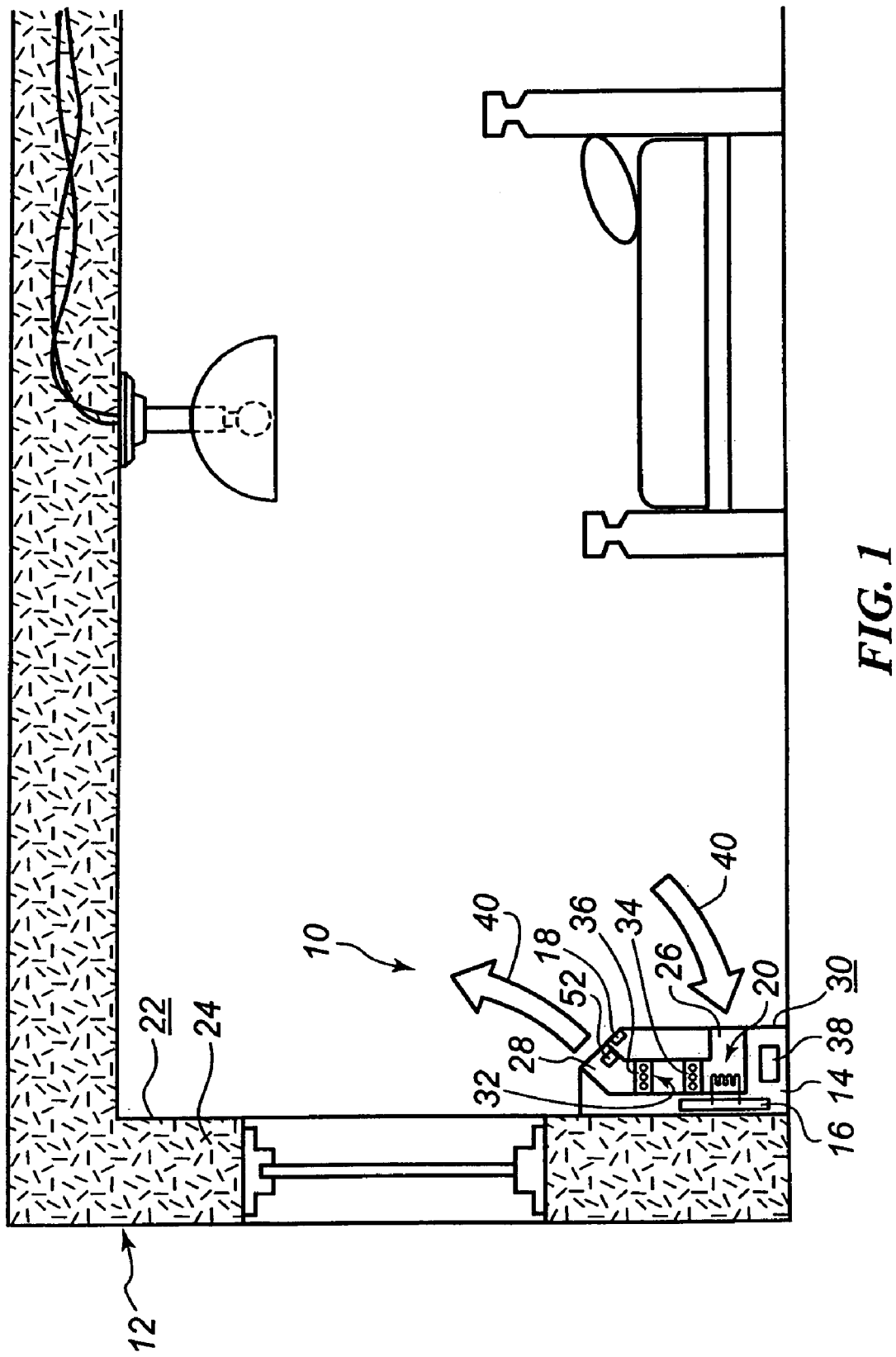
FIG. 1 is a simplified illustration of an exemplary embodiment of a package terminal air conditioner (PTAC) constructed in accordance with the teachings of the present invention.

Referring to FIG. 1, an air conditioning device 10, e.g. a package terminal air conditioner (PTAC) is illustrated. The PTAC is used within a structure 12 (e.g., a residential dwelling or commercial building) where central air is impractical or otherwise unwanted. For example, the PTAC is often used in hotel rooms to allow each of the guests to individually control the temperature in his/her own room. As shown in FIG. 1, the air conditioning device 10 comprises a body 14, refrigeration and heat exchanging hardware 16, control components 18, and a passage 20.

The body 14 is preferably constructed of a material such as steel, plastic, and the like. As shown in FIG. 1, the body 14 is used to mount the cooling device 10 to an interior surface 22 of a wall 24 of the structure 12. Although not shown, the body 14 can pass through the wall 24 so that fluids (e.g., hot air, water, etc.) can be vented and/or expelled outside the structure 12. The body 14 generally houses the heat exchanging hardware 16, the control components 18, and the passage 20.

Due to the many components that can be used, the heat exchanging hardware 16 has been shown in FIG. 1 in a simplified form. The hardware 16 generally includes a compressor (i.e., a condensing unit), an expansion valve, coils, a refrigerant, and the like. Therefore, the hardware 16 is able to repeatedly pass through the refrigeration cycle to selectively absorb and radiate heat. In one embodiment, the heat exchanging hardware 16 is a phase change heat pump.

The control components 18 are devices used to control the operation and features of the cooling device 10. The control components 18 are preferably located on or in body 14 of the cooling device 10 in a manner permitting easy access for a user a user. The control components 18 include one or more knobs, levers, switches, and the like. In some circumstances, the control components 18 can be covered and/or protected by a sliding door or pivoting cover.

The passage 20 in the body 14 extends between an inlet 26 and an outlet 28. The inlet 26 and outlet 28 each open through a front face 30 of the body 14 as shown in FIG. 1. In the illustrated embodiment, the outlet 28 is disposed vertically above the inlet 26. Each of the inlet and outlet 26, 28 can be protected by a cover, a grate, and the like. The passage 20 is proximate and/or adjacent to the hardware 16 to increase the ability of the hardware to absorb the heat from the air in and moving through the passage 20 in the cooling mode, and to heat the air in the passage 20 in the heating mode. Preferably, at least a portion of the heating and/or cooling portion of the hardware 16 is located in the passage 20 to increase the efficiency of the heat exchange.

The passage 20 also houses one or more corona discharge apparatuses 32. Each of the corona discharge apparatuses 32 in the passage 20 is an electrical device that relies on corona discharge and ion charge attraction to move air and, preferably, filter particles and pollutants from the air. In the illustrated embodiment, only one of the corona discharge apparatuses 32 is shown in the passage 20 although more or fewer may be used.

A typical corona discharge apparatus 32 employs numerous corona discharge electrodes 34 arranged in arrays and spaced apart from numerous negatively charged attracting electrodes 36 that are also arranged in arrays. When assembled into an array, the corona discharge electrodes 34 can be referred to as an emitter array. Likewise, the attracting electrodes 36 can be referred to a collector array. Due to the many array configurations and electrode shapes that can be used, the arrays of the corona discharge electrodes 34 and the attracting electrodes 36 have been shown in FIG. 1 in a simplified form.

Each of the corona discharge electrodes 34 and each of the attracting electrodes 36 are coupled to and charged by a high-voltage power supply 38. The electrodes 34, 36 are also preferably controlled and/or managed by related control electronics, e.g. control components 18, to control the speed of air moving through passage 20 (e.g. Low, Med, Hi speeds). In addition, the corona discharge electrodes 34 are typically asymmetrical with respect to the attracting electrodes 36. In one embodiment, the corona discharge electrodes 34 are highly curved and resemble the tip of a needle or a narrow wire while the attracting electrodes 36 take the form of a flat plate or a ground plane. The curvature of the corona discharge electrodes 34 ensures a high potential gradient around that electrode.

The high potential gradient generated at or near the corona discharge electrodes 34 basically pulls apart the neutral air molecules in the immediate area. What remains after each neutral air molecule has been dismantled is a positively charged ion and a negatively charged electron.

Due to the strong electric field near the corona discharge electrode 34, the ion and electron are increasingly separated from each other, prevented from recombining, and accelerated. Therefore, the ion and electron are both imparted with kinetic energy. Moreover, since a portion of the air molecules in the passage 20 is ionized, the air in the passage becomes a conducting medium, the circuit including the corona discharge electrodes 34 and the attracting electrodes 36 is completed, and a current flow can be sustained.

The negatively charged electrons are persuaded to move toward the positively charged corona discharge electrodes 34 due to the difference in charge between them. When the rapidly moving and accelerating electrons collide with other neutral air molecules in the area, further positive ion/electron pairs are created. As more and more positive/ion electric pairs are produced, an electron avalanche is established. The electron avalanche sustains and/or perpetuates the corona discharge process.

In contrast to the negatively charged electrons, the positively charged ions are persuaded to move from near the corona discharge electrodes 34 toward the attracting electrodes 36. This movement is due to the difference in charge between the positively charged ions and the negatively charged attracting electrodes. Like the electrons, when the positively charged ions move they also collide with neutral air molecules. When they collide, the positively charged ions can transfer some of their momentum as well as excess charge to the neutral air molecules. Therefore, the neutral air molecules are knocked toward the attracting electrode 36 or are ionized and then drawn to the attracting electrode. In either case, the positively charged ions and other air molecules end up flowing from the corona discharge electrodes 34 toward the attracting electrodes 36.

The movement or flow of the air particles away from the corona discharge electrodes 34 and toward the attracting electrodes 36 causes or results in what is referred to by those skilled in the art as an electric wind or electrostatic fluid acceleration. In the illustrated embodiment of FIG. 1, the electric wind travels through the passage 20 in a direction depicted by arrows 40.

In one embodiment, the velocity and volume of the air moving through the passage 20 is proportional to the voltage difference between the electrodes 34, 36 and the size of the arrays. By varying the potential between the electrodes 34, 36 via the control components 18, the size and dimensions of the passage, and the like, the velocity and volume of the electric wind can be increased and decreased over a continuous range or discrete values as desired. In any particular configuration, this range may be manually adjusted with a simple adjustment knob or remote control that varies the electric potential between the electrodes 34, 36. With the appropriate configuration, air flows exceeding six hundred cubic feet per minute are possible.

When the positively charged ions creating the electric wind reach the attracting electrodes 36, the positive charge is removed by permitting a recombination of the negatively charged electrons with the positively charged ions. Due to the recombination, neutral air molecules once again exist in the passage 20. Advantageously, these neutral air molecules retain their velocity and direction.

In a preferred embodiment, one or more corona discharge apparatuses 32 can be disposed within the passage 20 for the purpose of cleaning and scrubbing the air. Such beneficial and desirable filtering can be performed in addition to generating the electric wind. As known to those skilled in the art, contaminants and particles tend to adhere to the attracting electrode 36 during the corona discharge process. Therefore, the air passing through the passage 20 can be purified. The attracting electrodes 36, which are often plates, are preferably removable to permit inspection, cleaning, and replacement. In an alternative embodiment, the entire corona discharge apparatus 32 is removable.

As is known in the art, several patents and published applications have recognized that corona discharge devices may be used to generate ions and accelerate and filter fluids such as air. Such patents and published applications that describe fluid and/or air moving devices and technology include the following U.S. Pat. Nos. 3,638,058, 3,699,387, 3,751,715, 4,210,847, 4,231,766, 4,380,720, 4,643,745, 4,789,801, 5,077,500, 5,667,564, 6,176,977, 6,504,308, 6,664,741, and 6,727,657 and U.S. Pub. Pat. Applns. 2004/0217720, 2004/0212329, 2004/0183454, 2004/0155612, 2004/0004797, 2004/0004440, 2003/0234618, and 2003/0090209. The teachings and disclosure of each of these patents and published applications are incorporated in their entireties by reference thereto.

While other ion discharge or corona fluid movement technologies may be employed in the system and method of the present invention, a preferred embodiment of the present invention utilizes the technology described in one or more of the preceding patents and/or published applications, and most preferably, the technology described in U.S. Pat. Nos. 6,504,308, 6,664,741, and 6,727,657 issued to Kronos Advanced Technologies, Inc., of Belmont, Mass. The teachings and disclosure of each of these patents are also incorporated in their entireties by reference thereto.

Figure 2:
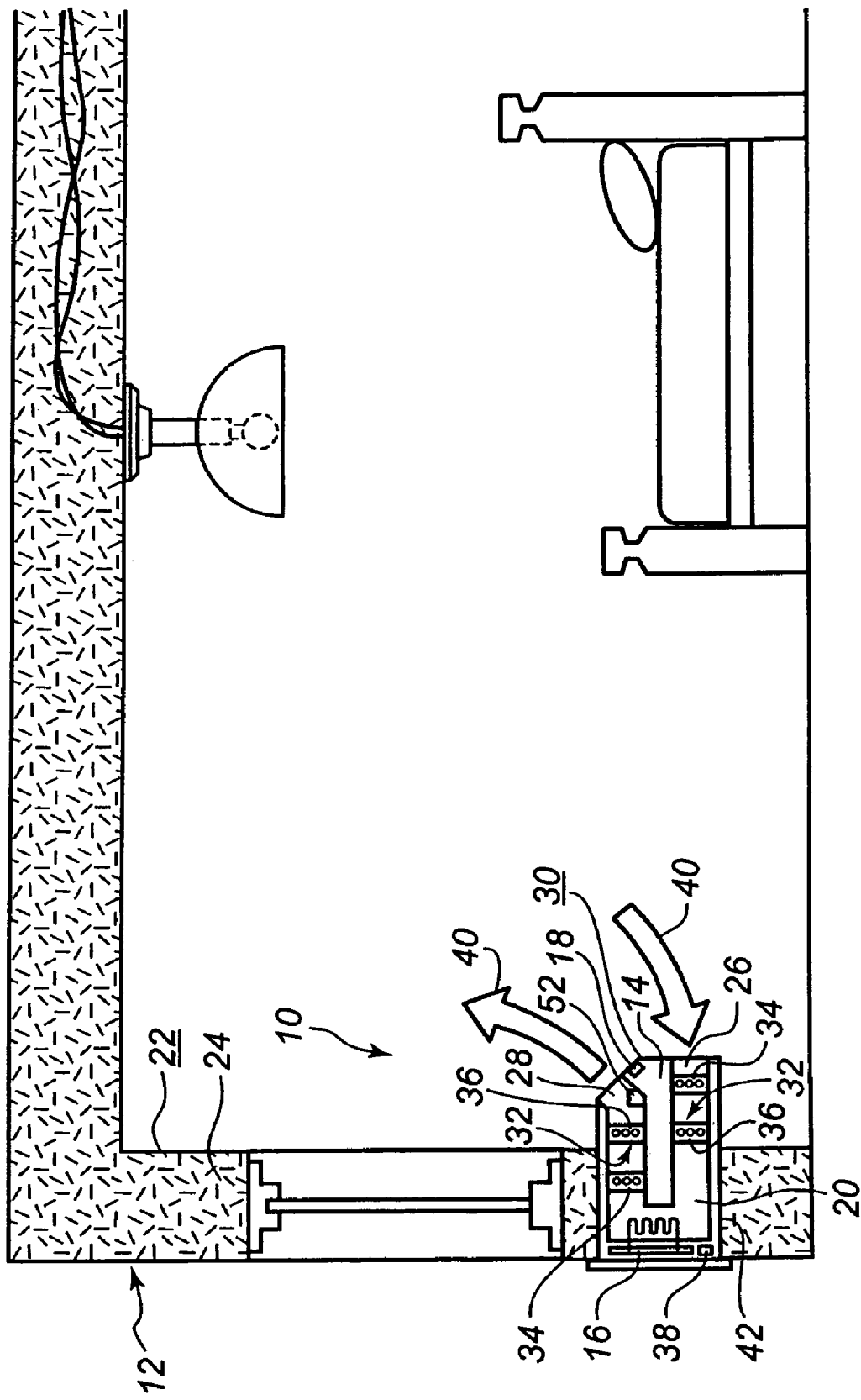
FIG. 2 is a simplified illustration of an exemplary embodiment of a room air conditioner (RAC) constructed in accordance with the teachings of the present invention.

In an alternate embodiment of the present invention, as illustrated in FIG. 2, the air conditioning device 10 is a room air conditioner (RAC). The RAC, like the PTAC of FIG. 1, is also found within those structures 12 where central air is impractical or otherwise unwanted. For example, the RAC can be placed in the window of a home or small business, a hotel room, mobile home, and the like.

The RAC is typically smaller in size than the PTAC. Therefore, the RAC can be installed in a small aperture 42 in the wall 24, as depicted in FIG. 2, or in a partially opened window as well known in the art. Because of its size and overall configuration, the RAC is relatively easy to remove from the structure 12. The cooling device 10 shown in FIG. 2 employs a pair of the corona discharge apparatuses 32 and, though somewhat differently organized and configured, operates similarly as detailed above, although a heating mode is often not included in such embodiments. As with the previous embodiment, one or more corona discharge apparatus(es) 32 may be used in the passage 20.

Figure 3:
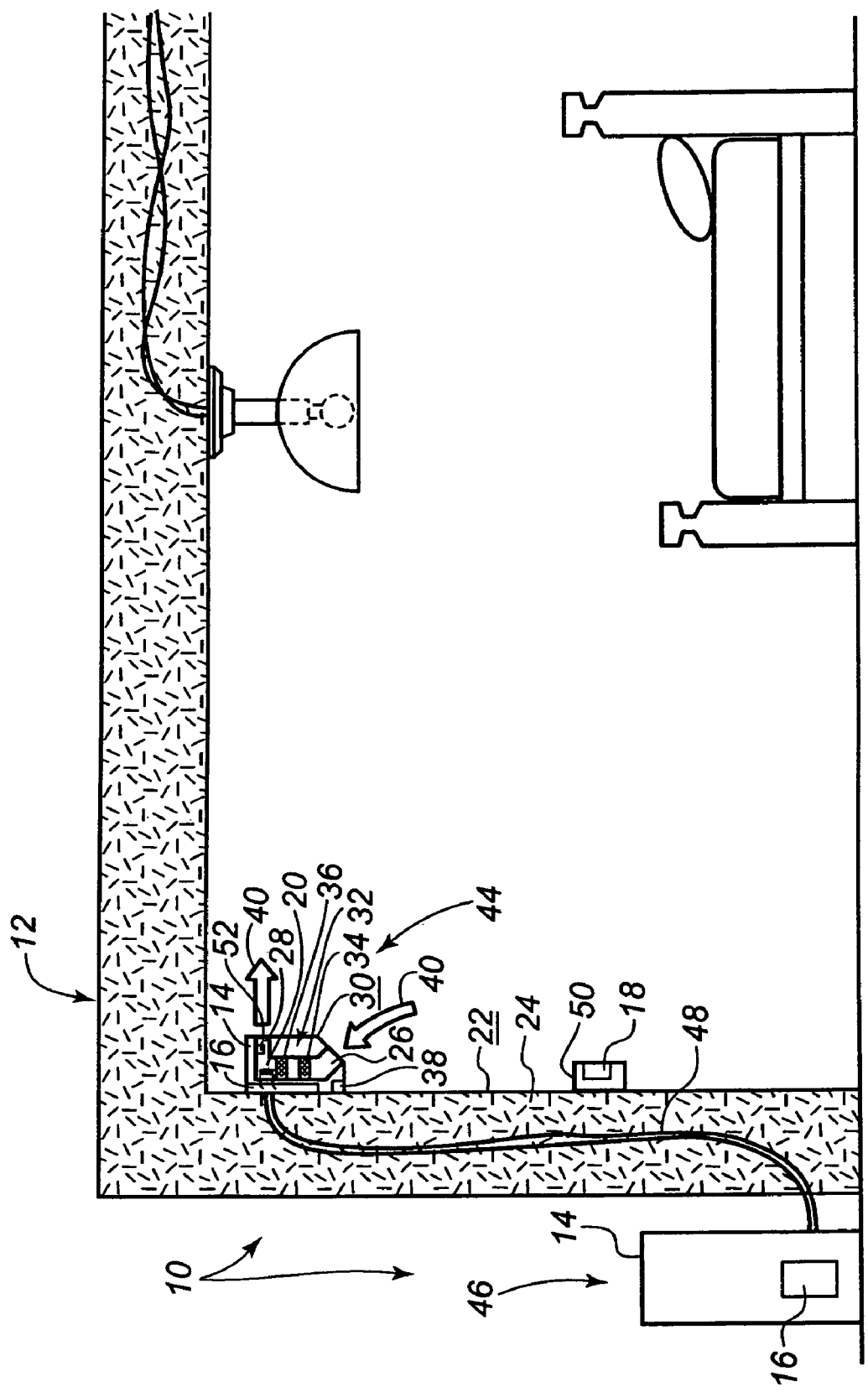
FIG. 3 is a simplified illustration of an exemplary embodiment of a Mini-Split air conditioner constructed in accordance with the teachings of the present invention.

In another embodiment as illustrated in FIG. 3, the air conditioning device 10 is shown as a split-mini or split-system air conditioner. The split-system is sometimes used in lieu of using several RACs which, in some cases, reside within and consequently obstruct a view through a window. The split-system air conditioner is similar to a central air conditioning system, as well known by those skilled in the art, but is generally smaller in size and scale, and allows individual room control. The split-system air conditioner generally includes the components of the found in the PTAC and RAC but separates the body 14 and the heat exchanging hardware 16 into a cold side 44, which is located within the structure 12, and a hot side 46, which is located outside the structure.

Sill referring to FIG. 3, the cold side 44 of the split system typically includes the expansion valve and the cold coil while the hot side 46 includes the compressor and the hot coil. The cold side 44 and the hot side 46 are connected and/or coupled together by one or more lines 48 that transport the refrigerant between the cold and hot sides 44, 46, electrically couple the two sides, and the like. In some cases, the split-system air conditioner also moves the control components 18 into a separate device, such as a thermostat 50, to provide easier access to a user.

The split system air conditioner shown in FIG. 3 enjoys some of the same benefits as the standard central air conditioning system. For example, since the split system disposes the hot side 46 of the air conditioning device 10 outside of the structure 12, any noise created by a fan or blower in the hot side remains predominantly outside of the structure. In one embodiment, although not shown, the hot side 46 of the split-system air conditioner can include a further corona discharge apparatus 32 to move the air and dissipate the heat generated by the refrigeration cycle. Again, though somewhat differently organized and configured that the air conditioning device 10 of FIGS. 1 and 2, the air conditioning device of FIG. 3 basically operates as detailed above.

In a preferred embodiment as illustrated in each of FIGS. 1–3, the cooling device 10 further comprises an ozone depletion apparatus 52 for reducing the amount of ozone in the fluid. In general, the ozone depletion apparatus 52 is any system, device, or method having the ability to degenerate ozone into oxygen (i.e., dioxide) and/or absorb ozone. In particular, the ozone depletion apparatus 52 can be a filter, a catalyst composition situated proximate the fluid, and the like. When the cooling device 10 is equipped with the ozone depletion apparatus 52, the ozone generated by the corona discharge apparatuses 32 can be maintained below a desired level, relegated to within a predetermined range, and otherwise managed.

While the ozone depletion apparatus 52 can be situated in a variety of different locations relative to the one or more corona discharge apparatuses 32, the ozone depletion apparatus is preferably disposed within the passage 20 proximate the outlet 28. In an exemplary embodiment, the ozone depletion apparatus 52 is generally downstream of the last corona discharge apparatus 32 in the air conditioning device 10. As such, air flowing out of the outlet 28 is purified by the ozone depletion apparatus 52 prior to entering the environment.

As is known in the art, several patents have recognized that ozone depletion devices and systems may be used to convert ozone to oxygen, absorb ozone, and the like. Such patents that describe converting and absorbing devices, methods, and technology include the following U.S. Pat. Nos. 4,343,776, 4,405,507, 5,422,331, 6,375,902, 6,375,905, and 6,699,529. The teachings and disclosure of each of these patents are incorporated in their entireties by reference thereto.

In operation, and referring to FIGS. 1–3, air is drawn into the passage 20 of the air conditioning device 10 through the inlet 26 due to the activation of one or more of the corona discharge apparatuses 32 and the corona discharge process as discussed above. Once drawn inside the passage 20, the air (or particles thereof) continues to move through the passage 20 in the direction indicated by the arrows 40. While residing within the passage 20, the heat from the moving air is absorbed by the heat exchanging hardware 16 such that the air is cooled when operated in a cooling mode.

After the air flowing through the passage 20 has been cooled, the air is expelled and/or exhausted into the environment through the outlet 28 by the corona discharge process. Since the air has been cooled, an ambient temperature of the environment is reduced. In other words, the environment is cooled by the air that has circulated through the air conditioning device 10 and been chilled. In a preferred embodiment, at least one of the corona discharge apparatuses 32 illustrated in FIGS. 1–3 also filters and cleans the air traveling through the passage 20 of the air conditioning device 10.

Advantageously, in accordance with the teachings of the present invention, the cooling device 10, whether in the form of the PTAC, the RAC, or the split-system air conditioner, may exhibit one or more of the following features. Because corona discharge air movement does not utilize any moving parts, such applications will experience quieter operation than the current products that utilize a rotating fan or blower. Further, they will be more efficient in their operation than similar products that utilize a rotating fan or blower. Another benefit enabled by the smaller size of comparable air movement is that such products can fit in the existing footprint of current products, and therefore they are backwards compatible. That is, they may replace existing, less efficient products. For new installations, these products can be made smaller because the air moving component of the product is smaller than the existing circular shaped fans and blowers.

Because the air conditioning device 10 having a corona air mover also attracts particulates to the corona discharge electrode (i.e., the collector electrode), the air purifier used to improve indoor air quality (IAQ) can be integrated into the air mover with removable plates for cleaning. Further, the indoor air quality can be improved beyond that achieved using filters. The cooling device 10 is able to remove cigarette and cigar smoke from the air, which is a very desirable feature in hotel rooms. Also, the cooling device 10 can be equipped to provide dehumidification such that water vapor can be removed from the air.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air conditioning device for heating and/or cooling an environment, comprising:
   a housing having a passage extending therethrough between an inlet and an outlet
   a heat exchanging apparatus in thermal communication with the passage; and
   a corona discharge apparatus positioned in relation to the passage such that when operated air from the environment is drawn into the passage through the inlet, moved through the passage, the corona discharge apparatus being the sole means for drawing the air into and through the passage, wherein a heat exchange with the heat exchanging apparatus takes place, and expelled through the outlet into the environment.

2. The air conditioning device of claim 1, further comprising a high-voltage power supply coupled to the corona discharge apparatus.

3. The air conditioning device of claim 2, further comprising at least one control component operatively coupled to the high-voltage power supply to vary an output voltage thereof.

4. The air conditioning device of claim 1, wherein the heat exchanging apparatus includes at least one heat exchanger coil positioned within the passage.

5. The air conditioning device of claim 1, wherein the heat exchanging apparatus is a phase change heat pump having at least one heat exchanger positioned within the passage.

6. The air conditioning device of claim 1, wherein the corona discharge apparatus includes at least one negatively charged plate removably positioned in the passage to permit at least one of inspection, cleaning, and replacement.

7. The air conditioning device of claim 1, wherein the corona discharge apparatus includes negatively charged plates configured to remove contaminants from the air in the passage.

8. The air conditioning device of claim 1, further comprising:
   a variable high-voltage power supply coupled to the corona discharge apparatus; and
   a control component operatively coupled to the high-voltage power supply to vary an output voltage thereof between at least two discrete voltages such that the corona discharge apparatus is operative to move air through the passage at at least two discrete speeds.

9. The air conditioning device of claim 1, further comprising:
   a variable high-voltage power supply coupled to the corona discharge apparatus; and
   a control component operatively coupled to the high-voltage power supply to vary an output voltage thereof over a continuous range of voltages such that the corona discharge apparatus is operative to move air through the passage at different speeds.

10. The air conditioning device of claim 1, wherein the corona discharge apparatus comprises a positively charged emitter array in spaced relation to a negatively charged collector array, the emitter array producing positively charge ions that are attracted to the negatively charged collector array.

11. The air conditioning device of claim 1, wherein the cooling device further comprises an ozone depletion apparatus positioned downstream of the corona discharge apparatus.

12. An air conditioner for cooling an environment, the air conditioner comprising:

a heat exchanging apparatus configured to absorb heat;

a passage operably coupled to the heat exchanging apparatus, the passage extending between an inlet and an outlet;

a positively charged emitter array in the passage; and a negatively charged collector array in the passage and in spaced relation to the positively charged emitter array, the positively charged emitter array and the negatively charged collector array cooperatively producing an electric wind in the passageway such that a fluid is drawn from the environment into the passage through the inlet, the fluid is moved through the passage where the heat from the fluid is absorbed by the heat exchanging apparatus to cool the fluid, and the cooled fluid is expelled through the outlet into the environment to cool the environment, the emitter array and collector array being the sole means for drawing the fluid into and through the passage.

13. The air conditioner of claim 12, wherein the heat exchanging apparatus is operative to dehumidify the fluid flowing through the passage.

14. The air conditioner of claim 12, further comprising a voltage source to provide a positive charge to the positively charged emitter array and a negative charge to the negatively charged collector array.

15. The air conditioner of claim 14, further comprising at least one control component operatively coupled to the voltage source to vary the positive and negative charge provided thereby to vary a speed of the electric wind.

16. The air conditioner of claim 12, wherein the heat exchanging apparatus comprises a hot side and a cold side, and wherein the hot side is positioned outside of the environment and wherein the cold side is positioned inside of the environment.

17. The air conditioner of claim 12, wherein the negatively charged collector array is configured as removable plates to permit at least one of inspection, cleaning, and replacement thereof.

18. The air conditioner of claim 12, further comprising an ozone depletion apparatus positioned in fluid communication with the passage.

19. The air conditioner of claim 18, wherein the ozone depletion apparatus is positioned in the passage downstream of at least one of the positively charged emitter array and the negatively charged collector array.

20. The air conditioner of claim 18, wherein the ozone depletion apparatus is positioned in proximity to the outlet.

* * * * *